(12) United States Patent
Lizotte

(10) Patent No.: US 7,548,323 B2
(45) Date of Patent: Jun. 16, 2009

(54) DISPLACEMENT AND FLATNESS MEASUREMENTS BY USE OF A LASER WITH DIFFRACTIVE OPTIC BEAM SHAPING AND A MULTIPLE POINT SENSOR ARRAY USING THE BACK REFLECTION OF AN ILLUMINATING LASER BEAM

(75) Inventor: Todd E. Lizotte, Manchester, NH (US)

(73) Assignee: Hitachi Via Mechanics, Ltd, Kanagawa (JP)

( * ) Notice: Subject to any disclaimer, the term of this patent is extended or adjusted under 35 U.S.C. 154(b) by 48 days.

(21) Appl. No.: 11/284,559

(22) Filed: Nov. 22, 2005

(65) Prior Publication Data

US 2006/0092430 A1    May 4, 2006

Related U.S. Application Data

(63) Continuation-in-part of application No. 11/259,525, filed on Oct. 26, 2005, now Pat. No. 7,307,711.

(60) Provisional application No. 60/629,941, filed on Nov. 22, 2004, provisional application No. 60/623,494, filed on Oct. 29, 2004, provisional application No. 60/652,293, filed on Feb. 11, 2005.

(51) Int. Cl.
   *G01B 11/30*    (2006.01)

(52) U.S. Cl. ...................................... 356/600
(58) Field of Classification Search ...................... None
   See application file for complete search history.

(56) References Cited

U.S. PATENT DOCUMENTS

| | | | | |
|---|---|---|---|---|
| 5,153,844 A | * | 10/1992 | Beni et al. | 702/167 |
| 5,781,269 A | * | 7/1998 | Ito et al. | 356/624 |
| 2002/0135774 A1 | * | 9/2002 | De Groot | 356/497 |

FOREIGN PATENT DOCUMENTS

| JP | 08-124828 | 5/1996 |
|---|---|---|
| JP | 2001-210261 | 8/2001 |

* cited by examiner

*Primary Examiner*—Michael P Stafira
(74) *Attorney, Agent, or Firm*—Davis & Bujold, P.L.L.C.

(57) ABSTRACT

A laser beam system for measuring an aspect of a surface wherein a laser beam is reshaped into a corrected shaped laser beam having a corrected energy profile and subsequently reshaped into a measurement shaped laser beam having an measurement energy profile shaped to be effected by the at least one aspect of the surface. The measurement shaped laser beam is reflected from the surface, being modified by the aspect of interest of the surface, and to a sensor array wherein the sensors measure the reflected laser beam to determine the aspect of interest of the surface.

2 Claims, 15 Drawing Sheets

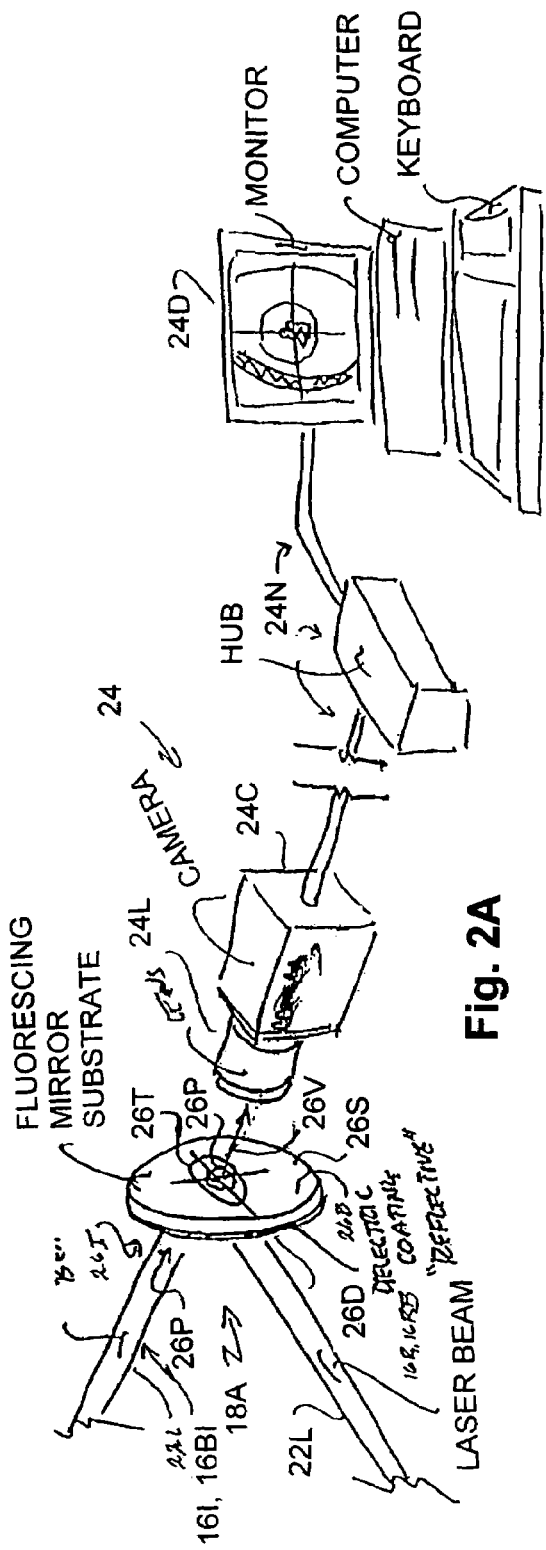
Fig. 2A
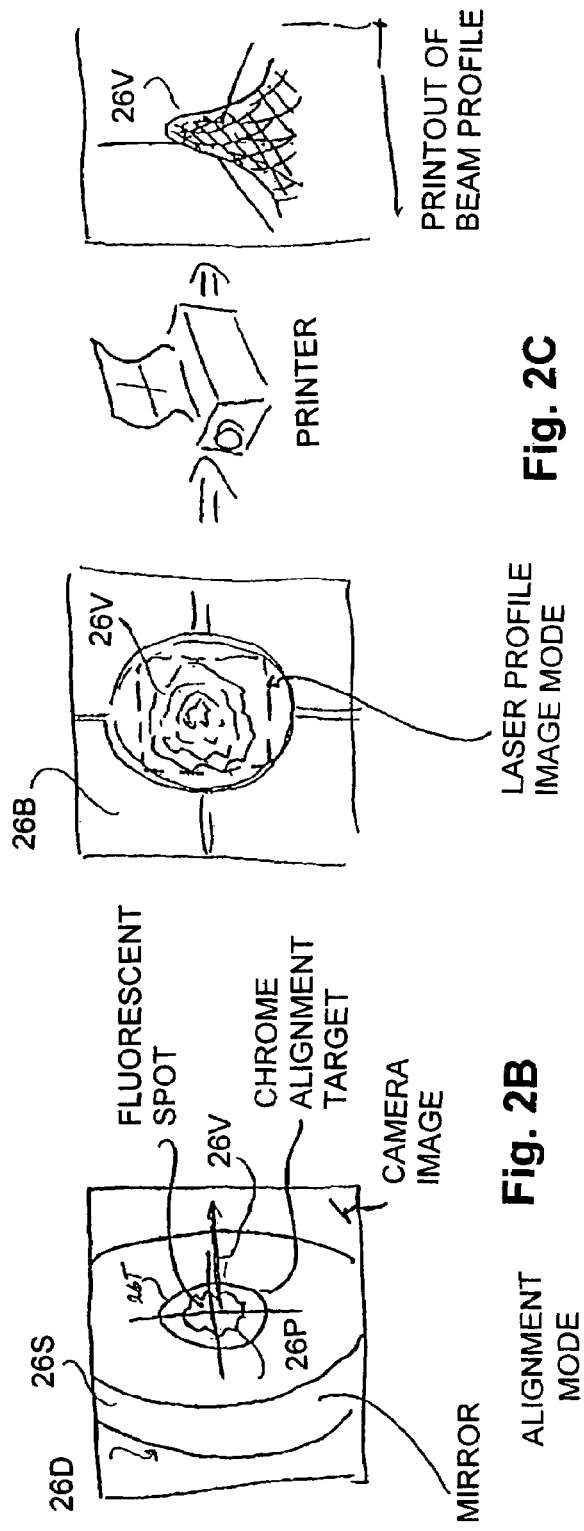
Fig. 2C
Fig. 2B

F-THETA LENS TESTING SYSTEM USING
FLUORESCENT IMAGING TECHNIQUE

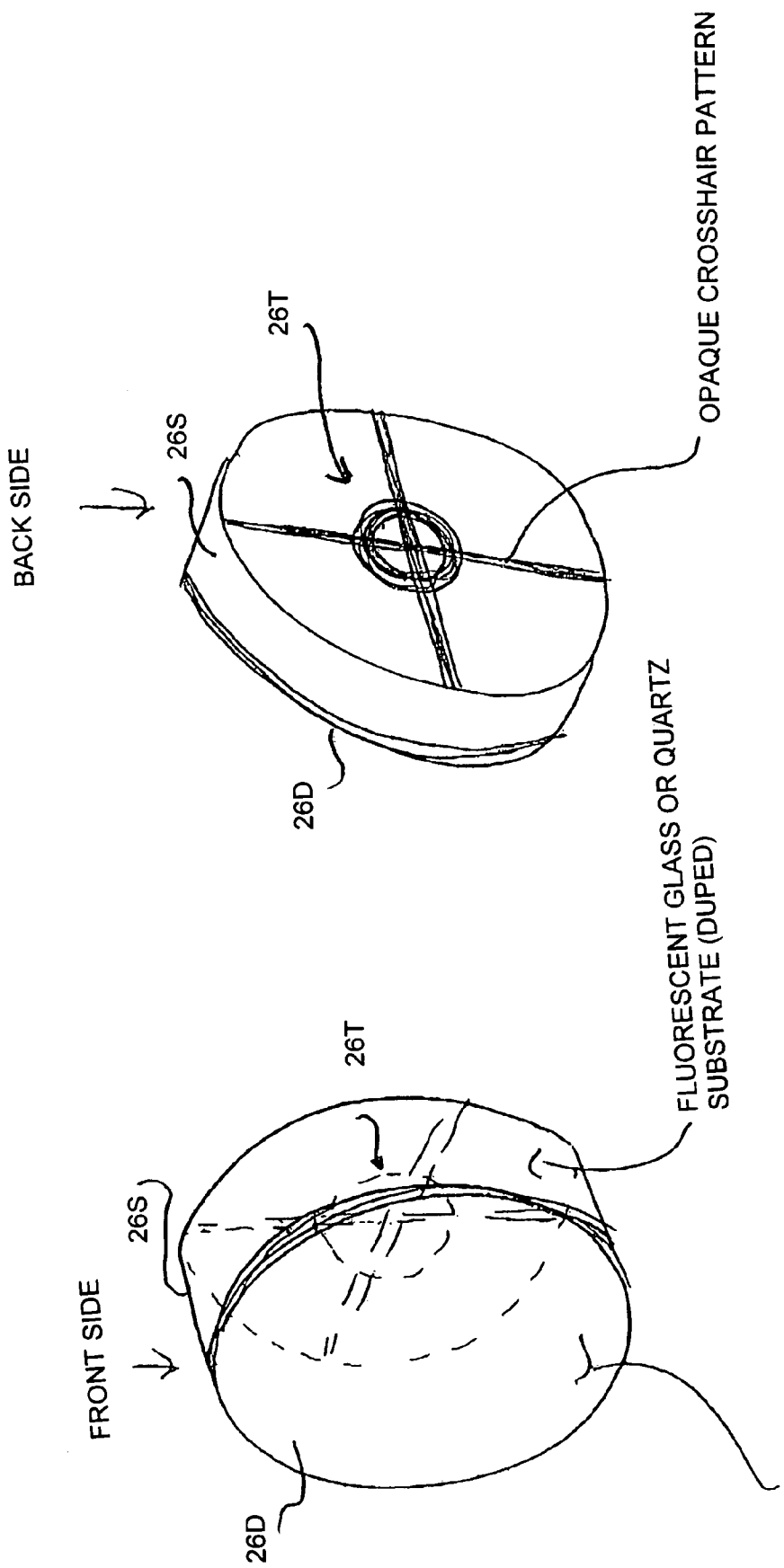

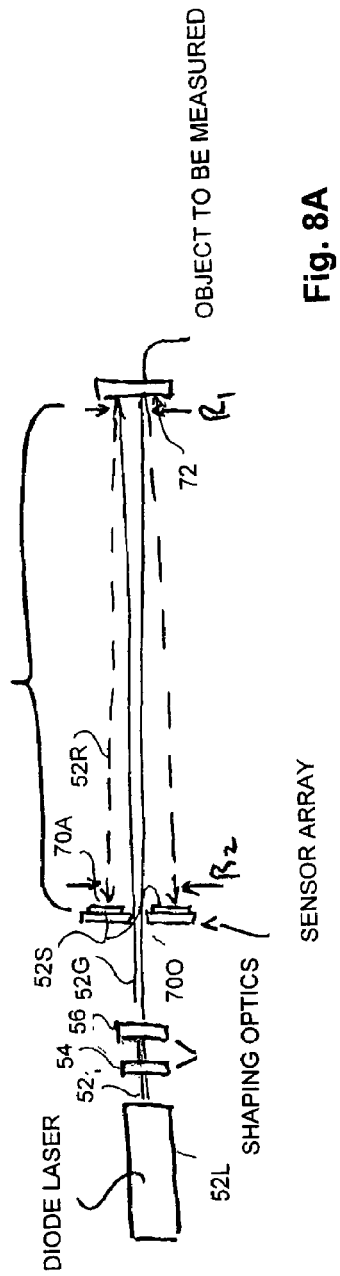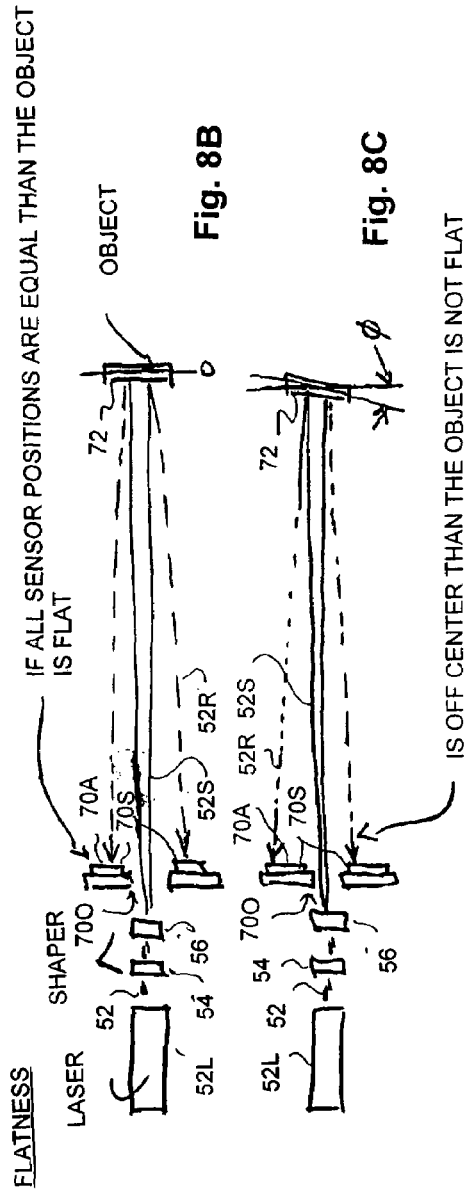

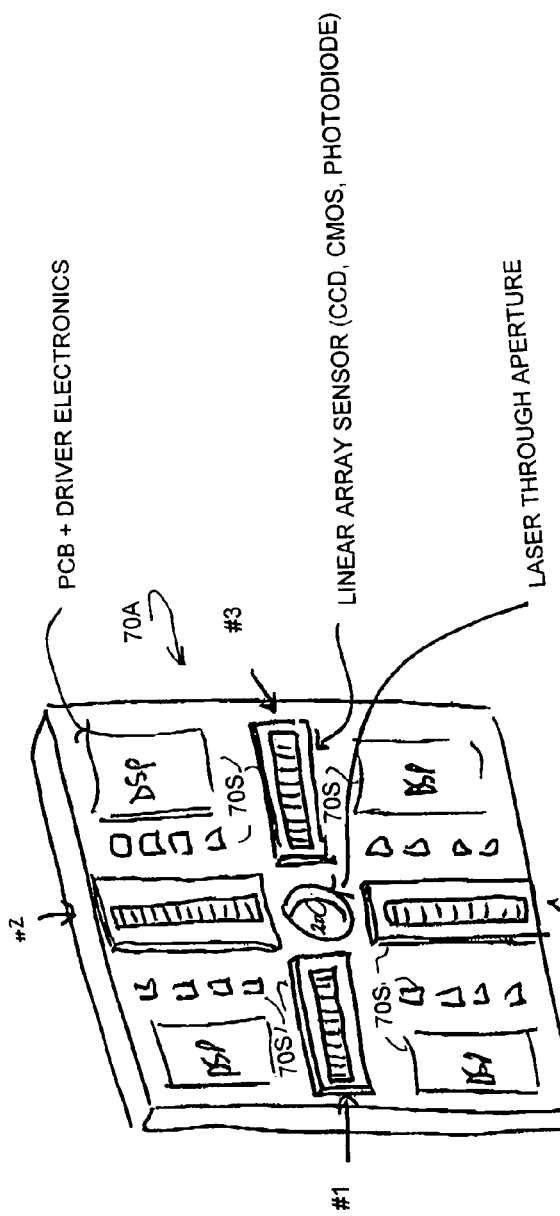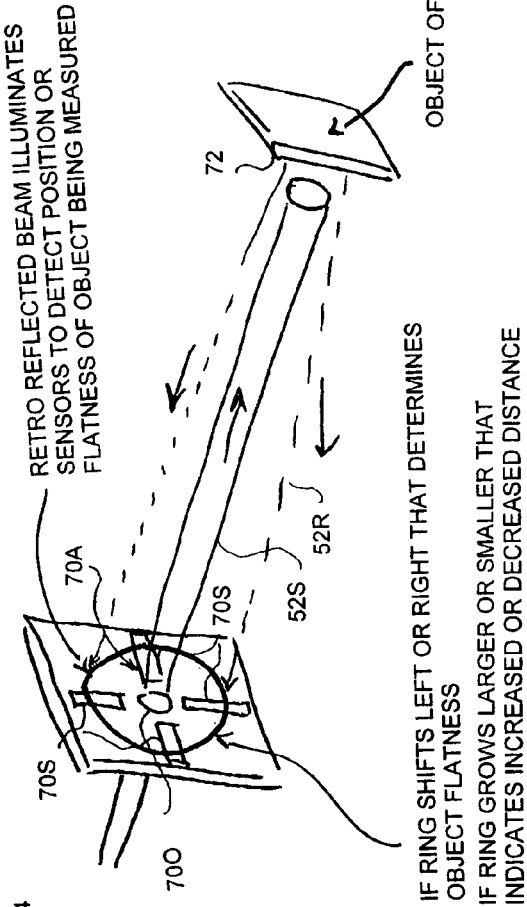

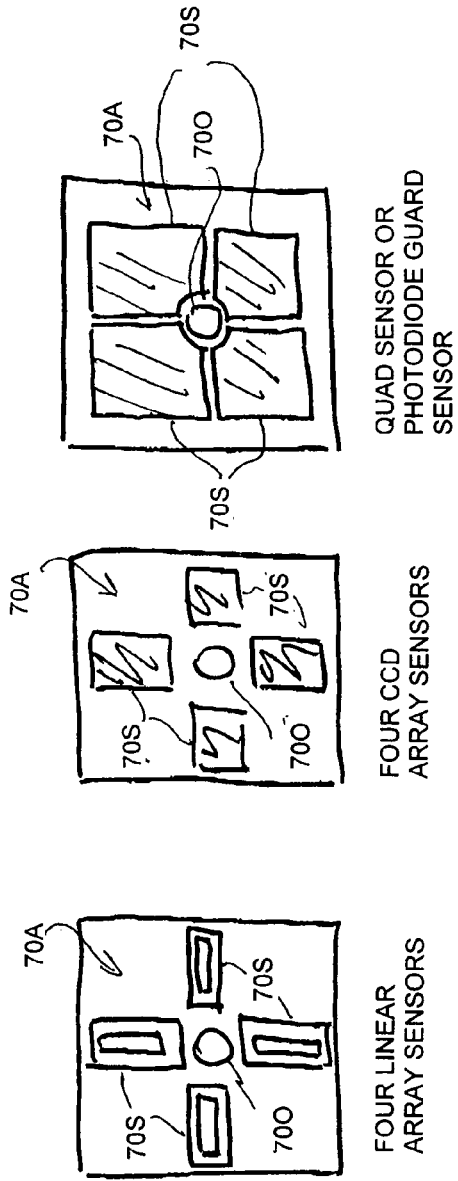
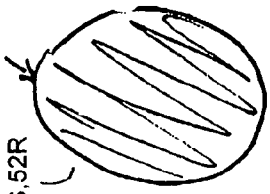
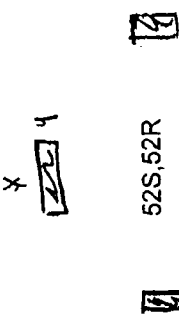
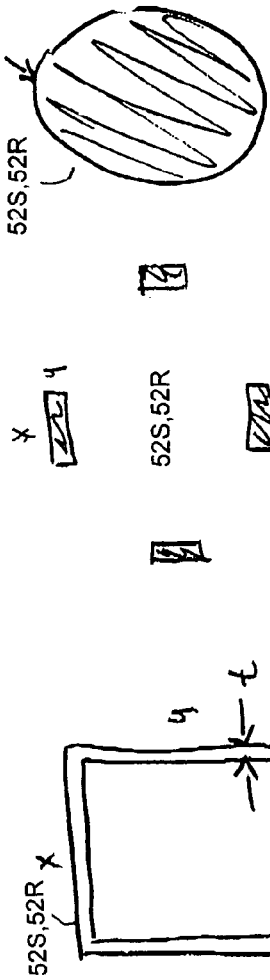
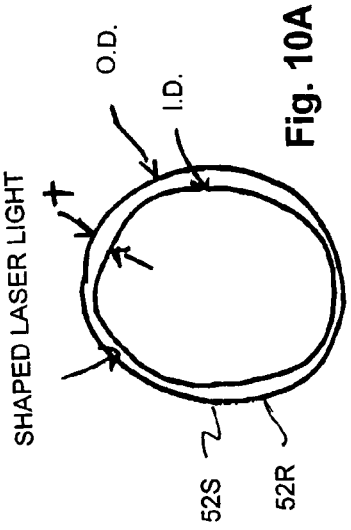

DISPLACEMENT AND FLATNESS MEASUREMENTS BY USE OF A LASER WITH DIFFRACTIVE OPTIC BEAM SHAPING AND A MULTIPLE POINT SENSOR ARRAY USING THE BACK REFLECTION OF AN ILLUMINATING LASER BEAM

CROSS REFERENCES TO RELATED APPLICATIONS

The present patent application claims benefit of Provisional Patent Application Ser. No. 60/629,941 filed Nov. 22, 2004 and is a continuation-in-part of and claims the benefit of U.S. patent application Ser. No. 11/259,525 filed Oct. 26, 2005, now U.S. Pat. No. 7,307,711 which in turn claims benefit of Provisional Patent Application Ser. No. 60/623,494 filed Oct. 29, 2004 and Provisional Patent Application Ser. No. 60/652,293 filed Feb. 11, 2005.

FIELD OF THE INVENTION

The present invention is related to a method and apparatus for aligning and testing the optical elements of a complex laser beam delivery system, including a method and apparatus for aligning and testing laser system optical elements by indirect observation of alignments and optical element properties indicated by fluorescing indicators, and, in particular, to a system and method for determining the flatness of a surface in, for example, a laser micro-machining or measurement systems

BACKGROUND OF THE INVENTION

Focused and directed laser beams are commonly used for a variety of processes, such as drilling of blind, through and micro-vias, laser imaging, dicing of substrates and modification or customization of integrated circuits, drilling, cutting, and selective material removal and other complex machining and micro-machining operations involving materials such as metals, polymers, integrated circuits, substrates, ceramics and other materials. Such processes have become very complex, often involving the concurrent or sequential of use of single or multiple lasers or multiple types of lasers, such as visible, infra-red (IR) and ultraviolet (UV) lasers, in concurrent or sequential operations. In generally all such laser processes, however, the general object of a laser system is to controllably and reliably direct, focus and concentrate the energy of one or more laser beans to converge each beam at a desired spot or to image an aperture area of a laser beam onto the surface of an object.

One of the major requirements for use of such systems is the alignment of the elements of the optical system to safely deliver a correctly focus and shaped laser beam at the intended target, which typically requires the individual and joint alignment of each optical element in the system. Stated simply, the alignment process requires that the aligner determine for each optical element, such as a mirror, where the beam strikes the optically functional area of the element. The aligner should also preferably be able to determine the shape or pattern of the beam at that point and possibly the relative power of the beam at that point.

This problem further compounded in that the laser beams generated in many laser beam delivery systems, such as ablation systems, are comprised of "invisible" or "non-visible", radiation, that is, radiation that is not visible to the unaided human eye. Such non-visible radiation may include, for example, UV (ultraviolet) radiation or infrared (IR) radiation, and may also include beams comprised of radiation at wavelengths that are in or near the visible spectrum but that because of other characteristics, such as power and beam width, are difficult to see and are thereby effectively "non-visible".

Such beams are also often of relatively high power levels, and are thereby a significant hazard to the eyes of the aligner and user of the system and to any others that may stray into the path of the beam as the aligner, user or bystander may be unaware of a hazard from the beam until damage has been inflicted. This problem is further compounded because it is effectively impossible to align a non-visible radiation system without optical assistance, thereby placing the aligner's eye or eyes in the danger zone.

For these reasons, UV systems of the prior art were typically aligned by inserting a piece of white paper into the general and assumed path of the UV beam. White paper typically fluoresces when irradiated with UV radiation, so that a fluorescent spot will appear on the paper indicated the position of the beam, if the paper is in the path of the beam. This method has a number of disadvantages, however. One is that the aligner is exposed to significant levels of scatter radiation, that is, UV radiation reflected from the surface of the paper, which can cause a "sun burn" type of injury or even photothalmia, which is effectively a sunburn of the eye tissues. The other problem is that the paper effectively blocks the path of the beam, so that if a mirror, for example, is behind the paper, the location at which the beam strikes the surface of the mirror must be estimated from the location at which the beam strikes the paper. This problem becomes more severe, of course, the greater the distance between the paper and the surface of the mirror and can be reduced by placing the paper closely on the surface of the mirror, which may be a problem in itself due to mechanical constraints and the possibility of smearing the surface of the mirror. Yet another problem with this method is that the laser beam sometimes "burns" the paper, resulting in the deposit of contaminates on the mirror or on other optical elements of the system.

There are also a number of related problems that repeatedly appear problems in such laser micro-machining operations. One problem, for example, is determining the position and orientation of the work surface, that is, the surface to be machined, relative to some known point in order to adjust and control, for example, the location, focus and depth of the laser beams to obtain the desired machining operation. In a further example, it is often necessary to determine the "flatness" of a work surface, that is, and for example, whether the work surface is tilted with respect to the axis of the coordinate system axes of the laser beam or is curved or otherwise warped away from being both "flat" and perpendicular to the intended axis of the laser beam. Information regarding the-"flatness" of a work surface can be used to adjust the orientation of the work surface with regard to the machining beam, or may be mapped to control the machining beam accordingly to obtain the optimum results.

Prior art laser displacement measurement systems relying on a triangulation method of determining distance. They use a single beam directed at an angle that when retro-reflected projects onto a single linear photo detector. This type of detector needs to be calibrated when installed and only provide one data point. If this type of unit is removed and re-installed it requires a complete re-calibration. The prior art systems do not allow for the calculation of flatness, to accomplish that they need to be indexed across a surface or scanned across a surface to sample three or more points, at which point a secondary CPU would need to calculate off line what the flatness is. These types of systems are very costly.

When the prior art systems are used in conjunction with automated assembly systems they lack the ability to provide closed loop feedback to positioning systems. The prior art systems require multiple sampling series to determine an objects position, then verify its position once the object has been correctly placed or adjusted using automated motion devices and actuators.

Prior art systems also lack the ability to use alternative wavelength of laser light including UV and various IR wavelengths. This limits the use of these types of laser triangulation devices to material which can reflect the wavelength being used.

The present invention provides a solution to these and related problems of the prior art

SUMMARY OF THE INVENTION

The present invention is directed to a laser beam system for measuring an aspect of a surface. The laser beam measuring system includes a laser generating a laser beam, a beam shape corrector for reshaping the laser beam into a corrected shaped laser beam having a corrected energy profile, and a measurement shaping element for reshaping the corrected shaped laser beam into a measurement shaped laser beam having an measurement energy profile shaped to be effected by the at least one aspect of the surface. The system further includes a sensor array having an opening for passing the measurement shaped laser beam to impinge upon the surface, whereupon the impinging measurement shaped laser beam is modified by the aspect of the surface during reflection from the surface. The sensor array includes a plurality of sensors for receiving and measuring corresponding portions a reflected laser beam from the surface, and wherein the measured corresponding portions of the reflected laser beam indicate the aspect of the surface.

According to the present invention, the aspects of the surface that could be determined include, for example, a tilt of the surface, a curvature of the surface, a warping of the surface, a distortion of the surface, or a distance of the surface from the sensor array, and the measurement energy profile and the plurality of sensors of the sensor array are selected according to the at least one aspect of the surface to the determined.

The laser measurement system may also include a plurality of sensor arrays for determining a corresponding plurality of the at least one aspect of the surface a multi-way splitter in the path of the reflected laser beam for directing a corresponding part of the reflected laser beam to a correspond one of the plurality of sensor arrays.

In at least one exemplary application of the present invention, the laser measurement system may further include at least one rotational controller for controlling a rotational position of the surface about a corresponding axis each such rotational controller may be responsive to an output of the sensor array for controlling the corresponding rotational position of the surface according to the at least one aspect of the surface determined by the laser measurement system. This implementation may be used, for example, to align one or more mirrors or the workpiece in a laser machining system.

In a typical exemplary embodiment of the system, the laser may generate an elliptical laser beam, the beam shape corrector may reshape the laser beam to have a corrected energy profile that is a Gaussian energy profile or a Flat Top energy profile, and the measurement shaping element may reshape the corrected shaped laser beam into a measurement shaped laser beam into a circular ring of laser light having a specific working distance.

BRIEF DESCRIPTION OF THE DRAWINGS

The invention will now be described, by way of example, with reference to the accompanying drawings in which:

FIGS. 2A-2E are diagrammatic representations of a monitor mirror and system of the present invention;

FIGS. 4A-4D are illustrating diagrams of the construction of turning and galvanometer mirrors;

FIGS. 8A, 8B, 8C and 8D are diagrammatic illustrations of the operation of a laser surface measurement system;

FIGS. 9A, 9B and 9C are diagrammatic representations of alternate embodiments of a sensor array of a laser surface measurement system;

FIGS. 10A, 10B, 10C and 10D are illustrations of alternate embodiments of beam cross section for use in a laser surface measurement system;

FIG. 11 is a diagrammatic representation of an embodiment of a sensor array of a laser surface measurement system;

DETAILED DESCRIPTION OF THE INVENTION

A. Alignment of Optical Elements in a Laser Beam System (FIGS. 1, 2A-2D)

Figure 1:
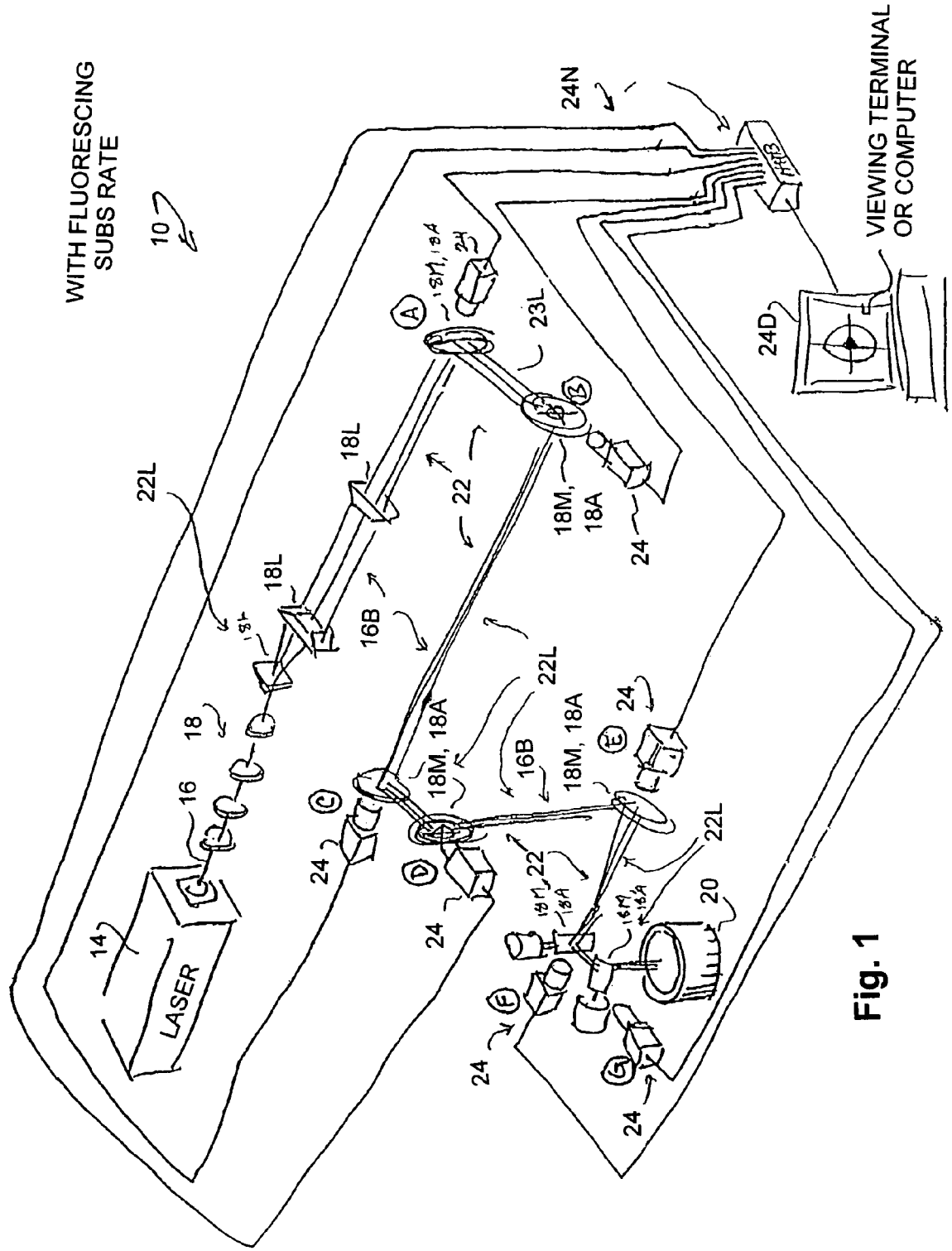
FIG. 1 is a is a diagrammatic representation of a laser beam system in which the alignment method and apparatus of the present invention may be implemented.

First considering the alignment of optical elements in a laser beam delivery system, FIG. 1 is a diagrammatic illustration of a Laser System 10 in which the present invention may be implemented and, as shown and as discussed in detail in the following, includes a Laser Alignment System 12 of the present invention.

As shown in FIG. 1, a System 10 includes a Laser 14 generating a Beam 16 comprised of non-visible radiation, such as ultraviolet (UV) or infrared (IR) energy or effectively non-visible radiation in a visible or near visible portion of the spectrum. The Beam 16 passes through a plurality of shaping and focusing Optical Elements 18 to a Target 20. The Optical Elements 18 of a typical System 10 will typically include or be comprised of either or both of a plurality of Lens 18L type and Mirror 18M type elements arranged to shape and focus the original Beam 16 in a number of ways. Certain Optical Elements 18 may, for example, divide the original Beam 16 into a plurality of Beamlets 16B and will then shape and focus the Beamlets 16B onto the Target 20. In this regard, it will be understood by those of skill in the arts that the Optical Elements 18 may include not only conventional lenses of a wide range of types and functions, but also other types of "lens" elements such as holographic optical elements, diffraction elements, refraction and splitting elements, and so on, telescopic arrangements and beam image forming elements, also referred to as aperture elements. As shown, the Mirror 18M elements will typically be used to direct the Beam 16 and Beamlets 16B along successive Legs 22L of the Beam Path 22 from Laser 14 to Target 20, including folding Beam Path 22 to allow a more compact layout of the System 10.

It is apparent that the determination and adjustment of the alignment, focus and shape of Beam 16/Beamlets 16B along Beam Path 22, must be performed at several points along Beam Path 22, such as at each significant function or operation performed on Beam 16 or Beamlets 16B. Examples of such points along the Beam Path 22 would include those points where the Beam 16 or Beamlets 16B encounter a Lens 18L element or a Mirror 18M element. In particular, the determination and adjustment of the alignment, focus and shape of Beam 16 or Beamlets 16B would preferably be performed at least at the end of each Leg 22L of Beam Path 22 or, in the equivalent, at or before each redirection of Beam Path 22 into a next Leg 22L of Beam Path 22.

In this regard, it will be understood by those of skill in the arts that for a number of reasons the means for determining the alignment, focus and shape of a Beam 16 or Beamlets 16B would preferably not require the placing of an interruption or obstruction in the path of the beam. For example, the insertion of an obstruction in the beam path could result in backscatter or redirection of the Beam 16 of Beamlets 16B in unwanted directions. Also, the placing of some object in the beam path to detect the alignment and possibly the shape and focus of the Beam 16 or Beamlets 16B would require that the object, such as an monitor camera lens, be of a nature so as not to be damaged by the Beam 16 or Beamlets 16B.

It must also be noted that the effect or function of a Lens 18L is dependent upon a Beam 16 or Beamlets 16B being transmitted through the Lens 18L. In particular, in many instances the effect or results of the transmission of a Beam 16 or Beamlets 16B through a Lens 18L on the alignment, focus or shape of a Beam 16 or Beamlets 16B is dependent not only on the characteristics of the lens element itself, but also upon the shape, focus, alignment or angle with which the Beam 16 or Beamlets 16B enter the lens element. For this reason, blocking the path of a Beam 16 or Beamlets 16B through a Lens 18L element may result in a false indication of the alignment, focus or shape of the Beam 16 or Beamlets 16B after that point, that is, after the Beam 16 or Beamlets 16B actually pass through the Lens 18L element.

For these reasons among others, the method and apparatus of the present invention determines the alignment, focus and shape of Beam 16 or Beamlets 16B at Mirrors 16M, that is, at the points where the Beam 16 or Beamlets 16B are redirected into a new Leg 22 of the beam path. As will be described in the following, the method and apparatus of the present invention employ an Alignment Mirror 18A element in place of the Mirrors 18M of a convention system. The Alignment Mirrors 18A of the present invention are capable of indicating the point of incidence of a Beam 16 or Beamlets 16B on the face of the Mirror 18M, and thereby the alignment of the Beam 16 or Beamlets 16B, without obstructing Beam Path 22. As will also be described, an Alignment Mirror 18A of the present invention is also capable of representing the focus and shape of the Beam 16 or Beamlets 16B at the incident face of the Mirror 18M, or of the Beamlets 16B in the case of multiple Beamlets 16B, as well as the alignment of the Beam 16 or Beamlets 16B.

Referring to FIGS. 2A and 2B, FIGS. 2A and 2B are diagrammatic representations of an Alignment Mirror 18A of the present invention and an associated Beam Monitor 24, which includes a Monitor Lens 24L and a Monitor Camera 24C connected through an Alignment Network 24N to an Alignment Display 24D. As indicated in FIGS. 2A and 2B, the Alignment Mirrors 18A of the present invention replace Mirrors 18M and each is comprised of a Fluorescing Substrate 26S with a Mirror Dielectric Coating 26D on Incident Face 26I and an Alignment Target 26T on Back Face 26B.

In a presently preferred embodiment, Fluorescing Substrate 26S is comprised of glass that is generally transparent to visible light and that is doped to fluoresce and emit visible light when Incident Face 26I is irradiated with non-visible radiation, such as UV or IR radiation or effectively non-visible radiation in a visible or near visible portion of the spectrum, from an Incident Beam 16I or one or more Incident Beamlets 16BI.

Mirror Dielectric Coating 26D, in turn, is selected to Incident Face 26I reflect approximately 99% of the Incident Beam 16I or Incident Beamlet 16BI radiation incident on Mirror Dielectric Coating 26D and to transmit approximately 1% of the incident radiation through Mirror Dielectric Coating 26D and into Fluorescent Substrate 26S.

According to the present invention, therefore, the major part of the incident Beam 16 or Beamlet 16B radiation arriving on Incident Face 26I from the previous Leg 22L of Beam Path 22 will be reflected from Mirror Dielectric Coating 26D and redirected into the next Leg 22L of Beam Path 22 in the usual manner as a Reflected Beam 16R or Reflected Beamlet 16BR.

The part of the Incident Beam 16I or Incident Beamlet 16BI radiation arriving on Incident Face 26I that is transmitted through Mirror Dielectric Coating 26D will, however, enter Fluorescent Substrate 26S. The radiation from the Incident Beam 16I or Incident Beamlet 16BI will thereby cause Fluorescent Substrate 26D to fluoresce at the Point of Incidence 26P of the Incident Beam 16I or Incident Beamlet 16BI on Fluorescing Substrate 26S and to thereby emit a Visible Light Image 26V originating from the Point of Incidence 26P. As indicated, Visible Light Image 26V will pass through Fluorescing Substrate 26S to Back Face 26B where the Visible Light Image 26V can be observed, either by a human operator or, preferably, through Beam Monitor 24. The same result will occur when the mirror is comprised of a non-fluorescing transparent substrate with a fluorescent ceramic coating on the back side of the mirror, except that the Visual Light Image 26V will be generated directly on and through the ceramic coating rather than being generated in and transmitted through the main body of the substrate.

It will, therefore, be apparent that the fluorescence at Point of Incidence 26P indicates the alignment of the Incident Beam 16I or Incident Beamlet 16BI on the reflecting face of the Alignment Mirror 18A, so that the Alignment Mirror 18A, and preceding elements in Beam Path 22, may be: adjusted to provide the desired alignments along Beam Path 22. In this regard, it should be noted that Alignment Target 26T on Back Face 26B will assist in determining the location of Point of Incidence 26P with respect to a fixed alignment target provided by Alignment Mirror 18A at a desired Point of Incidence 26P on Incident Face 26I, thereby allowing the Point of Incidence 26P of an Incident Beam 16I or Incident Beamlet 16BI to be aligned onto the Alignment Target 26T.

It must be further noted that, as illustrated in FIG. 2C, the pattern and energy level of Visible Light Image 26V, particularly as viewed from Back Face 26B of Fluorescent Substrate 26S, will also be representative of the shape and focus of Incident Beam 16I or Incident Beamlet 16BI and of the relative energy level of Incident Beam 16I or Incident Beamlet 16BI. For this reason, the method and apparatus of the present invention may also be used to determine the shape, focus and relative energy levels of Beams 16 and Beamlets 16B at each point along Beam Path 22 at which an Alignment Mirror 18A is located. This capability in turn allows more complete control of the alignment of Beams 16 and Beamlets 16B along Beam Path 22. In addition, determination of the shape, focus and energy levels of the beams determinations of the shape, focus and energy levels of Beams 16 and Beamlets 16B along Beam Path 22 allows some direct or indirect control over the effects and adjustments of Lens 18L type elements as well as Alignment Mirrors 18A. As illustrated in FIG. 2C, the shape, focus and energy levels of a Beam 16 or Beamlet 16b or Beamlets 16B as represented by Visible Emission 26V may be displayed and the visual representation may be converted into numeric data that may, in turn, be plotted and displayed in various manners.

Figures 2D, 2E:
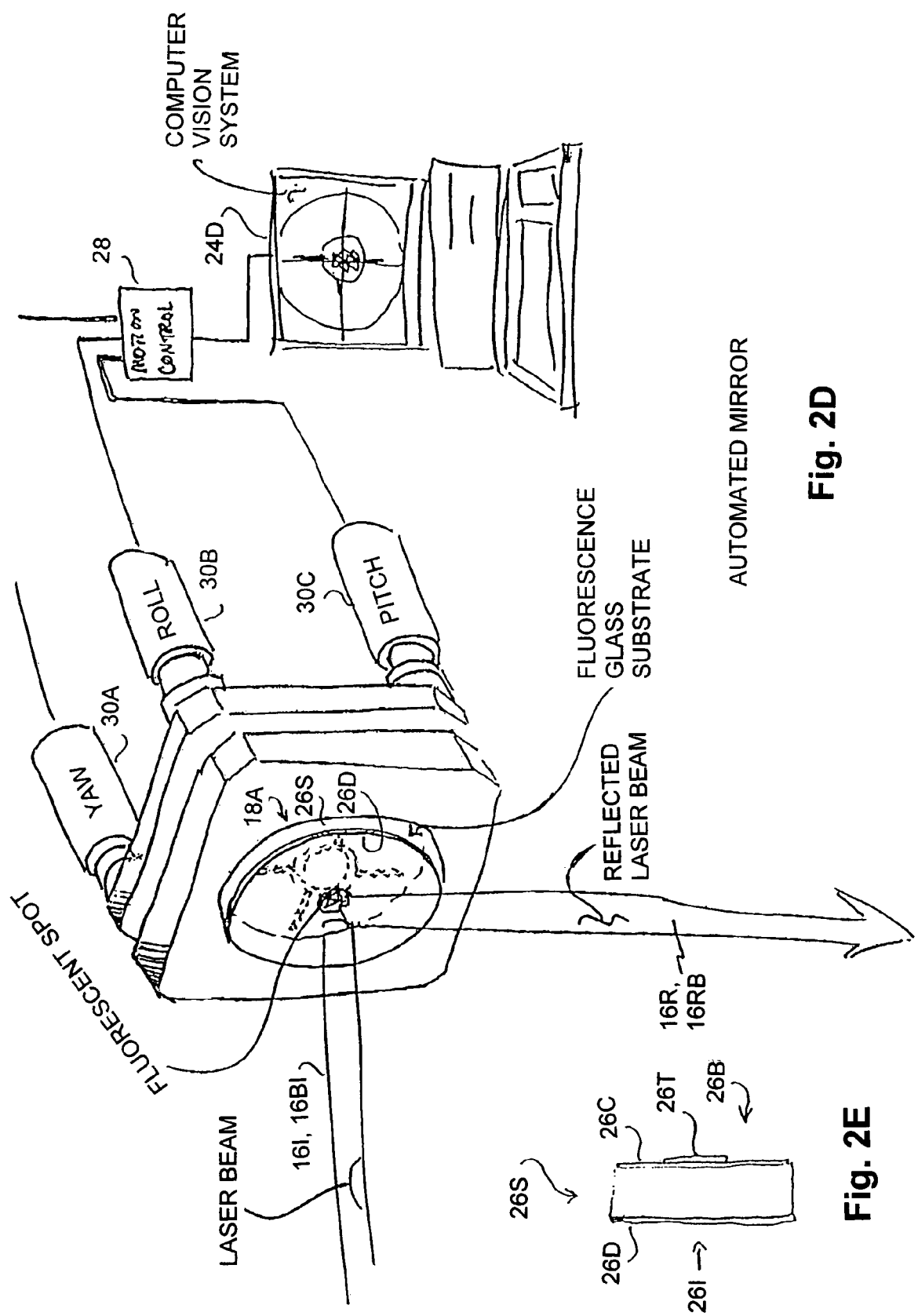

Lastly, FIG. 2D illustrates an extension to the System 10 shown in FIG. 2A wherein a Motion Controller 28 connected to a Display/Controller 24D and to Mirror Actuators 30A, 30B and 30C may be used to adjust and control the angles of incidence and reflection of each Alignment Mirror 18A around three axis, thereby allowing full control of the alignment of the Alignment Mirror 18A for each Leg 22L of the Beam Path 22.

In a presently preferred embodiment of an Alignment Mirror 18A, Fluorescent Substrate 26S is comprised of a fluorescent glass and has typical and approximate dimensions of 50 mm outer diameter by 5 to 10 mm in thickness. Typical examples of the fluorescent glass used in the substrates include, for example, SUMITA LUMILASS-R7, -G9 or -B, all available from SUMITA OPTICAL CLASS, INC. The SUMITA LUMILASS-R7, -G9 or -B glasses all fluoresce when stimulated by radiation at various frequencies in the UV range, and respectively emit visible light in the red, green and blue portions of the visible light spectrum.

Mirror Dielectric Coating 26D, in turn, is typically comprised of multilayer dielectric stack deposited on Incident Face 26I by a deposition process. Alignment Target 26T is typically comprised of chrome or gold deposited by a deposition process and typically forms a target or gunsight type pattern formed of a cross or cross hairs and a circle and is of dimensions dependent upon those of the mirror and the beam. The target pattern presented by Alignment Target 26T may also be selected according to the thoughts and desired of the designer regarding what pattern would provide a suitable target for alignment purposes.

In an alternate embodiment, illustrated in FIG. 2E, Fluorescent Substrate 26S may be comprised of a non-fluorescent material, such as a glass, with Dielectric Coating 26D on Incident Face 26I and a Fluorescent Ceramic Coating 26C and an Alignment Target 26T applied of deposited on Back Face 26B. In this embodiment of an Alignment Mirror 18A, the Incident Beam 16I or Incident Beamlet 16BIn will pass through the main body of the substrate to and the Visible Light Image 26V will be emitted from Fluorescent Ceramic Coating 26C rather than from within the material of the Fluorescent Substrate 26S.

B. Testing of Optical Elements for a Laser Beam System (FIGS. 3A,3B)

As described previously, the method and apparatus of the present invention may be further extended for use in the testing of optical elements, such as F-theta lenses and other lenses, for a laser beam delivery system.

Figure 3A:
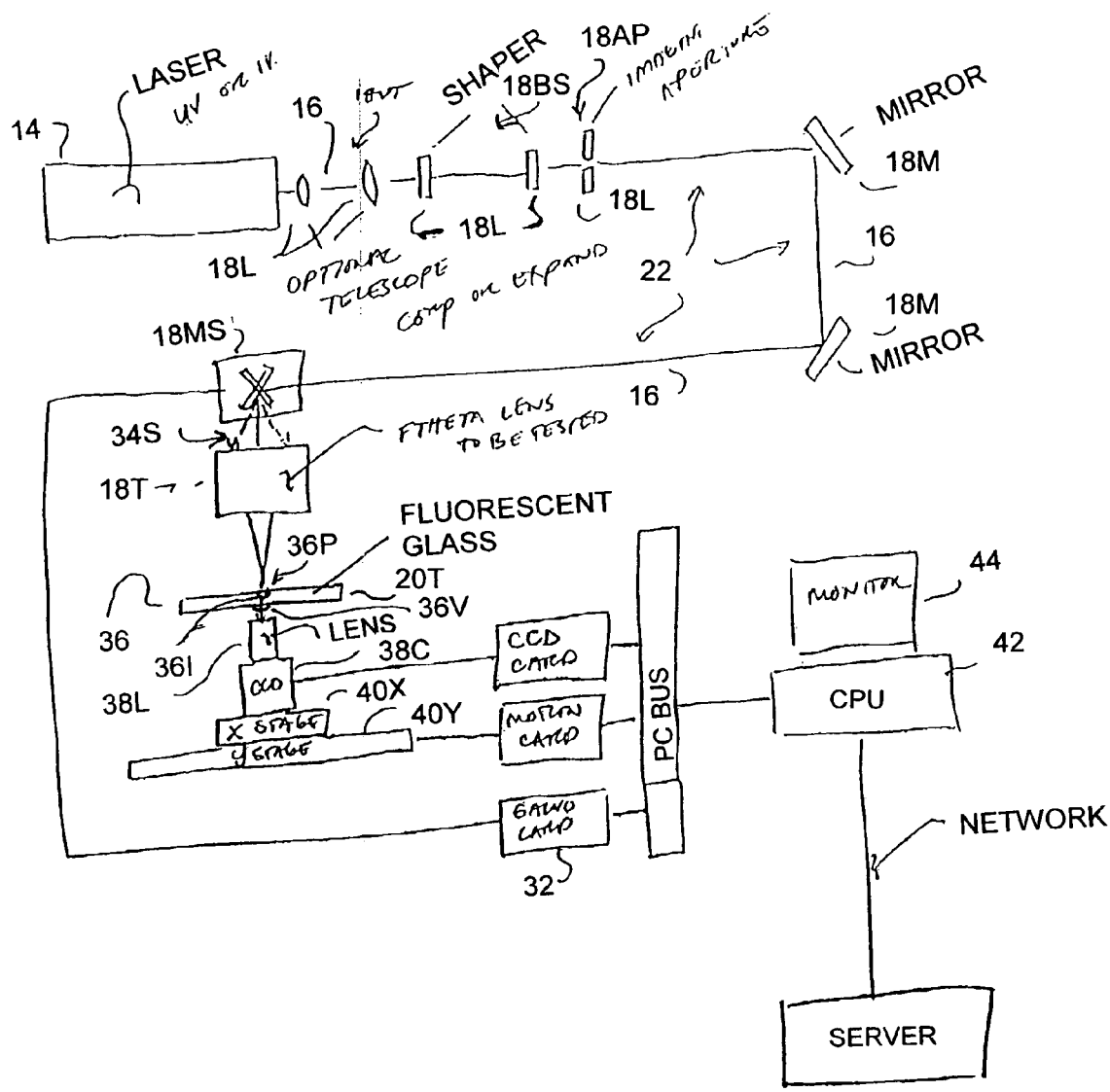
FIG. 3A is a diagrammatic representation of the lens testing method and apparatus of the present invention.
Figure 3B:
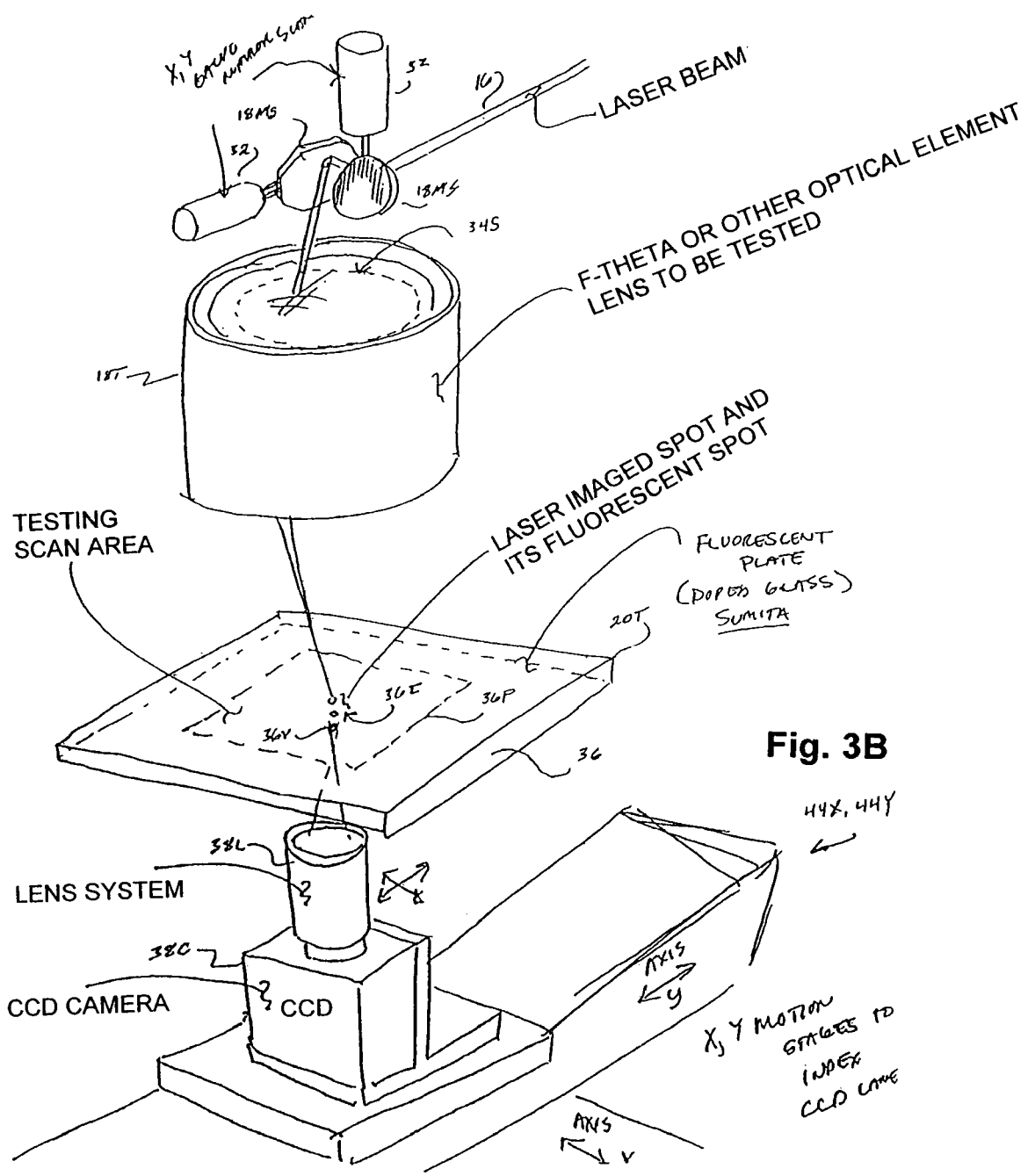
FIG. 3B is a diagrammatic isometric view of the lens testing method and apparatus.

Referring to FIGS. 3A and 3B, therein is shown a diagrammatic representation of a Lens Test System 12 of the present invention may be implemented. As illustrated therein, and as discussed above with reference to FIG. 1, the System 12 will be generally similar in many respects to a Laser Beam System 10 and will typically include a Laser 14 generating a Beam 16 which passes along a Beam Path 22 through a plurality of shaping and focusing Optical Elements 18 to a Target 20. In a typical Lens Test System 12, Beam 16 may be comprised of, for example, non-visible radiation, such as UV or IR radiation or effectively non-visible radiation in a visible or near visible portion of the spectrum, depending upon the type of lens being tested and the spectrum of interest for testing the lens.

As in the instance of a Laser Beam System 10, a typical Lens Test System 12 will typically include a plurality of Optical Elements 18, certain of which will direct, shape and focus the original Beam 16 in a number of ways and others of which will divide the original Beam 16 into a plurality of Beamlets 16B and will then shape and focus the Beamlets 16B onto the Target 20. As shown, and as illustrated with respect to a System 10 as discussed above, the Optical Elements 18 of a Lens Test System 12 will also typically include a plurality of Mirrors 18M which direct and steer the Beam 16 and Beamlets 16B along successive Legs 22L of the Beam Path 22 from Laser 14 to Test Target 26T, including folding Beam Path 22 to allow a more compact layout of the System 12.

It will be understood by those of skill in the arts that the Optical Elements 18 of a Lens Test System 12 may include conventional lenses of a wide range of types and functions, as well as other types of "lens" elements, such as holographic optical elements, diffraction elements, refraction and splitting elements, and so on.

In particular, and according to the present invention, the Lens Test System 12 will also include at least one Test Lens 18T whose properties, characteristics and specifications are to be tested and determined, such as an F-theta type lens.

As shown in FIGS. 3A and 3B, the Optical Elements 18 of a Lens Test System 12 include a optional Optical Elements 18, the selection and arrangement of which are dependent upon the specific type of Test Lens 18T and the test conditions and requirements for testing and measuring the Test Lens 18T. For example, a Lens Test System 12 will typically include a Variable Telescope 18VT to focus and control the size of the Beam 16 and may include an optional Beam Shaper 18BS to model the Beam 16 wavefront and an optional Aperture 18AP to shape the cross section image of the Beam 16 to thereby simulate an imaging system. The Lens Test System 12 will also typically include a number of Mirrors 18M to direct Beam 16 through a folded and extended Beam Path 22 that terminates in Scanning Mirrors 18MS that are controlled by Galvanometers 32 that may be controlled to scan the Beam 16 over an Operational Lens Scanning Area 34S of the Test Lens 18T if necessary or desired.

According to the present invention, Test Target 20 is comprised of a Target Plate 36 formed of a glass that fluoresces when stimulate by the radiation comprising Beam 16, that is, when stimulated by, for example, non-visible radiation, such as UV or IR radiation or effectively non-visible radiation in a visible or near visible portion of the spectrum. Typical examples of such materials have been discussed herein above with regard to Alignment Mirrors 18M.

In an alternate embodiment, Test Target 20 may be comprised of a non-fluorescent substrate with a fluorescent ceramic coating applied to either the incident face or the back face of the substrate, such as also discussed herein above.

The incidence of Beam 16 on Target Plate 36 will thereby result in the generation of a Fluorescent Visible Light Image 36I where Beam 16 impinges on Target Plate 36. Fluorescent Visible Light Image 36I is transmitted through the Target Plate 36 as a Visible Light Image 36V and the Visible Light Image 36I and the location of the Visible Light Image 36I, which corresponds to the location of the Fluorescent Image 36I, are monitored and determined by an Imaging Lens 38L and, Camera 38C, such as a CCD camera. In this regard, and particularly if the Beam 16 impinging on Test Lens 18 is scanned across Operational Scanning Area 34S of the Test Lens 18T by one or more Scanning Mirrors 18MS, Fluorescent Visible Light Image 36I and the Visible Light Image 36I will appear in and on Target Plate 36 in a Plate Scanning Area 36P. The location of Fluorescent Visible Light Image 36I may typically be determined by indexing Imaging Lens 38L and Camera 38C to the location of Visible Light Image 36V within the plane of Target Plate 36 by means of X- and Y-Motion Stages 40X and 40Y.

The location, shape, intensity pattern and so on of the Visible Light Image 36V will then represent and define the characteristics and properties of the impinging Beam 16, which are determined by means of a Computer System 42 with Display 44. At the same time, the characteristics and properties of Beam 16 as it impinges on Test Lens 18T are known, including the position and angle at which the Beam 16 impinges upon Test Lens 18T. As will be well understood by those of ordinary skill in the arts, the characteristics and properties of Beam 16 at Input Side 34I will be determined in part by Computer System 42, which controls, for example, Mirrors 18M and 18MS, and in part by the selected and known characteristics of, for example, Variable Telescope 18VT, Beam Shaper 18BS, Aperture 18AP. The characteristics and properties of the Beam 16 at Target Plate 36 as determined from Visible Light Image 36V may then be compared with the known, defined and controlled characteristics of the Beam 16 at the point the Beam 16 impinges on the Test Lens 18T, thereby allowing the characteristics and properties of the Test Lens 18T to be determined. In this regard, it must be noted that the characteristics and properties of the Test Lens 18T may be determined and mapped over the entire Operational Scanning Area 34S of a Test Lens 18T by scanning the impinging Beam 18 across the Operational Scanning Area 34S by the operation of Scanning Mirrors 18MS.

Figures 4A, 4B:
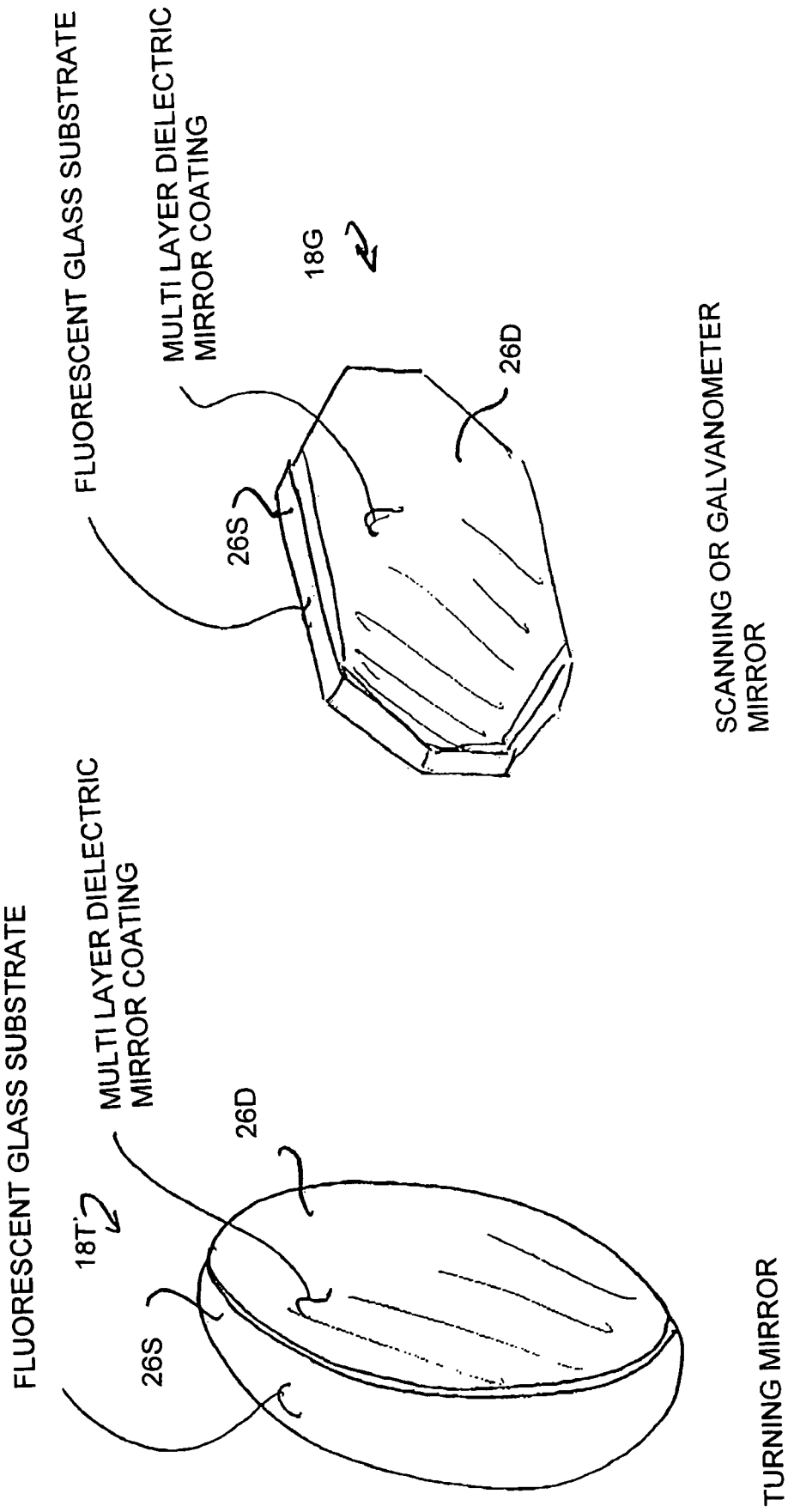

C. Further Aspects and Implementations of the Methods and Apparatus for Aligning Laser Beams Next considering further aspects, embodiments and implementations of the above described methods and apparatus for aligning laser beams, as illustrated in FIGS. 4A and 4B the Alignment Mirrors 18A and Scanning Mirrors 18MS of the present invention as described above may be generally described as comprised of Turning Mirrors 18T and Galvanometer Mirrors 18G. Turning Mirrors 18T are typically employed to redirect or turn a beam path and thus the beam traveling along the beam path and are referred to as such because they are used to "turn" the beam through an angle, but are not continuously adjusted or moved during normal operation. Galvanometer Mirrors 18G, in turn, are typically used to dynamically turn or redirect a beam during normal operation, such as to dynamically redirect or steer a beam in a scanning pattern. As such, Galvanometer Mirrors 18G are generally supported and controlled by some form of dynamically variable mechanism capable or rapid movement of the mirror during normal and continuous operation, such as a galvanometer. A Turning Mirror 18T, however, typically adjusted or repositioned only at much longer intervals and can be repositioned relatively slowly.

As a consequence and as indicated in FIGS. 4A and 4B, Turning Mirrors 18T and Galvanometer Mirrors 18G are typically of different shapes, each shape being selected as optimal or at least preferable for its particular application. For example, a Turning Mirror 18T is preferably round to allow a wider field of capture of a non- or mis-aligned beam. A Galvanometer Mirror 18G, however, does not require as large a capture field as it will typically be receiving a beam that has been correctly aligned by means, for example, of a Turning Mirror 18T, but preferably is of reduced mass and inertial moment as it typically must be rapidly redirectable, or scannable. As illustrated in FIG. 4B, therefore, Galvanometer Mirror 18G would typically have a shape providing an adequate capture area with a reduced inertial moment, such as a hexagon. As illustrated in FIGS. 4C and 4D, a Turning Mirror 18T or Galvanometer Mirror 18G of the present invention is typically constructed of a Fluorescing Substrate 26S with a Mirror Dielectric Coating 26D on one face as the reflective surface of the mirror. As also described, a Fluorescing Substrate 26S is comprised of glass that is generally transparent to visible light and that is doped to fluoresce and emit visible light when Incident Face 26I is irradiated with non-visible radiation, such as UV or IR radiation or effectively non-visible radiation in a visible or near visible portion of the spectrum, from an Incident Beam 16I or one or more Incident Beamlets 16BI.

In a presently preferred embodiment, the substrate can be created by a formulation of 1:10 ratio of fluorescent frit to bulk glass material, such BK7. Varying the ratio from 1:5 to 1:20 allows differing degrees of fluorescing brightness. The substrate is then created by a vacuum furnace which melts the materials together. This type of furnace process is typically used in the glass fabrication industry. The fluorescent frit materials or bulk materials can be sourced from Spruce Pin Batch Company, S. Carolina USA and Sumita Optical Glass Co., Japan.

In this regard, it must be noted that the fluorescing components of the substrated may be comprised of dopants embedded into the substrate, as described above, or, in an alternate embodiment, dopants coated onto the substrate. In further alternative embodiments, the fluorescing component may be comprised of a layer of fluorescing material located on a back face of the substrate, such as under the Alignment Target 26T described below, or of a layer of fluorescing material located under the dielectric coating on the front face of the substrate, as described next below.

A Mirror Dielectric Coating 26D, in turn, is typically comprised of multilayer dielectric stack deposited on Incident Face 26I by a deposition process and, in the present implementations, is typically selected to reflect approximately 99% of the Incident Beam 16I or Incident Beamlet 16BI radiation and to transmit approximately 1% of the incident radiation through Mirror Dielectric Coating 26D and into Fluorescent Substrate 26S.

As also illustrated in FIGS. 4C and 4D, and as discussed previously, a Turning Mirror 18T or Galvanometer Mirror 18 typically also includes an Alignment Target 26T on Back Face 26B of the mirror to assist in determining the position of the Incident Beam 16I on the reflecting face of the mirror location of Point of Incidence 26P. As has been discussed above, the Alignment Target 26T indicates the desired point of incidence of the Incident Beam 16I on the reflecting face of the mirror while the fluorescent Visible Light Image 26V formed by Incident Beam 16I passing into the Fluorescent Substrate 26S indicates the actual point of incidence of the Incident Beam 16I on the mirror, as monitored by, for example, a Beam Monitor 24. The user or system may then align the Visible Light Image 26V and thereby the Incident Beam 16I onto the desired point on the mirror to provide the desired alignment of the beam. As also described, an Alignment Target 26T is typically comprised of chrome or gold deposited by a deposition process and typically forms a target or gunsight type pattern formed of a cross or cross hairs and a circle and is of dimensions dependent upon those of the mirror and the beam. The target pattern presented by Alignment Target 26T may also be selected according to the thoughts and desirer of the designer regarding what pattern would provide a suitable target for alignment purposes.

In alternate embodiments of Turning Mirrors 18T or Galvanometer Mirrors 18G, Fluorescent Substrate 26S may be comprised of a non-fluorescent material, such as a glass, with a Dielectric Coating 26D on Incident Face 26I and a Fluorescent Ceramic Coating 26C and an Alignment Target 26T applied of deposited on Back Face 26B. In this embodiment, the Incident Beam 16I or Incident Beamlet 16B will pass through the main body of the substrate to the Fluorescent Ceramic Coating 26C and the Visible Light Image 26V will be emitted from Fluorescent Ceramic Coating 26C rather than from within the material of the Fluorescent Substrate 26S.

Figure 5:
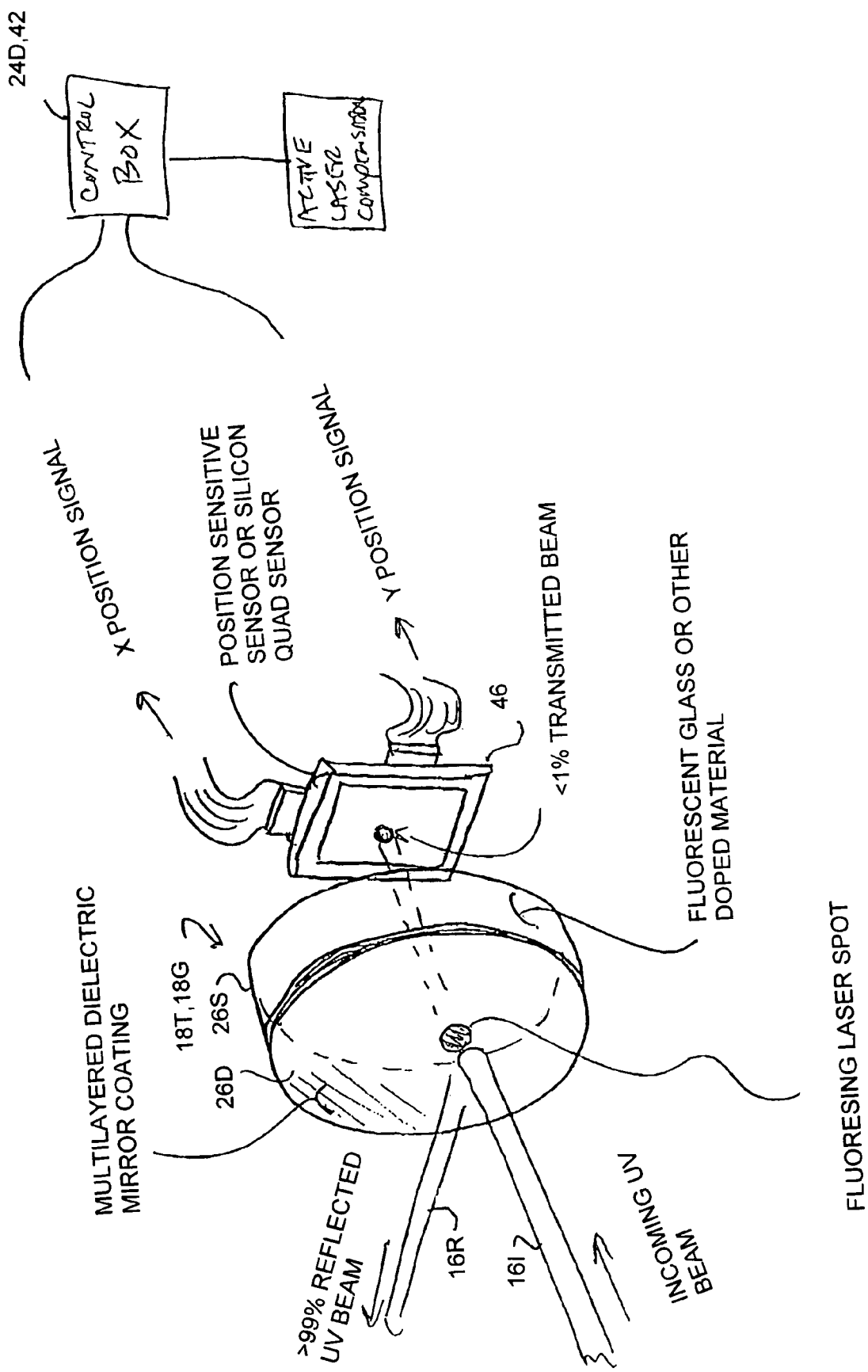
FIG. 5 is a diagram of an alignment mechanism employing a position sensor.

Referring now to FIG. 5, therein is illustrated a further embodiment of the beam alignment system described above with regard to FIGS. 2A-2D. The Turning Mirror 18T or Galvanometer Mirror 18G again typically includes a Fluorescing Substrate 26S with a Mirror Dielectric Coating 26D on the front face as the reflective surface of the mirror, but typically does not include an Alignment Target 26T on the back surface of the mirror. The functions of an Alignment Target 26T and a Beam Monitor 24 are instead performed by a Position Sensor 46 that is located on or close to the back surface of the mirror and that directly senses and indicates the position of the Visible Light Image 26V within the detection area of the Position Sensor 46. A Position Sensor 46 may be comprised, for example, of a unitary two dimensional array of cells generating row and column output signals on row and column output lines. Each row signal and each column signal is proportionate to the illumination striking the cell at the intersection represented by the corresponding row and column signal lines, thereby indicating the point of incidence of Visible Light Image 26V on the array and thus the position of incidence of Incident Beam 16I on the mirror. In an alternate embodiment, the Position Sensor 46 may be comprised of several sensor arrays, such as a silicon quad sensor, rather than a unitary uniform array of sensor cells.

As described herein above with reference, for example, to FIGS. 1, 2A-2D and 3A and 3B, the output signals of Position Sensor 46 indicating the position of the Visible Light Image 26V within the detection area of the Position Sensor 46 thus the position of incidence of Incident Beam 16I on the mirror may then be provided to a mirror orientation controller, such as a Computer System 42. The mirror orient can then adjust the orientations of the Turning Mirrors 18T or Galvanometer Mirrors 18G so that the Incident Beam 16I is incident to the desired locations on each Turning Mirror 18T or Galvanometer Mirror 18G so that the beam is directed along the desired path.

Figure 6:
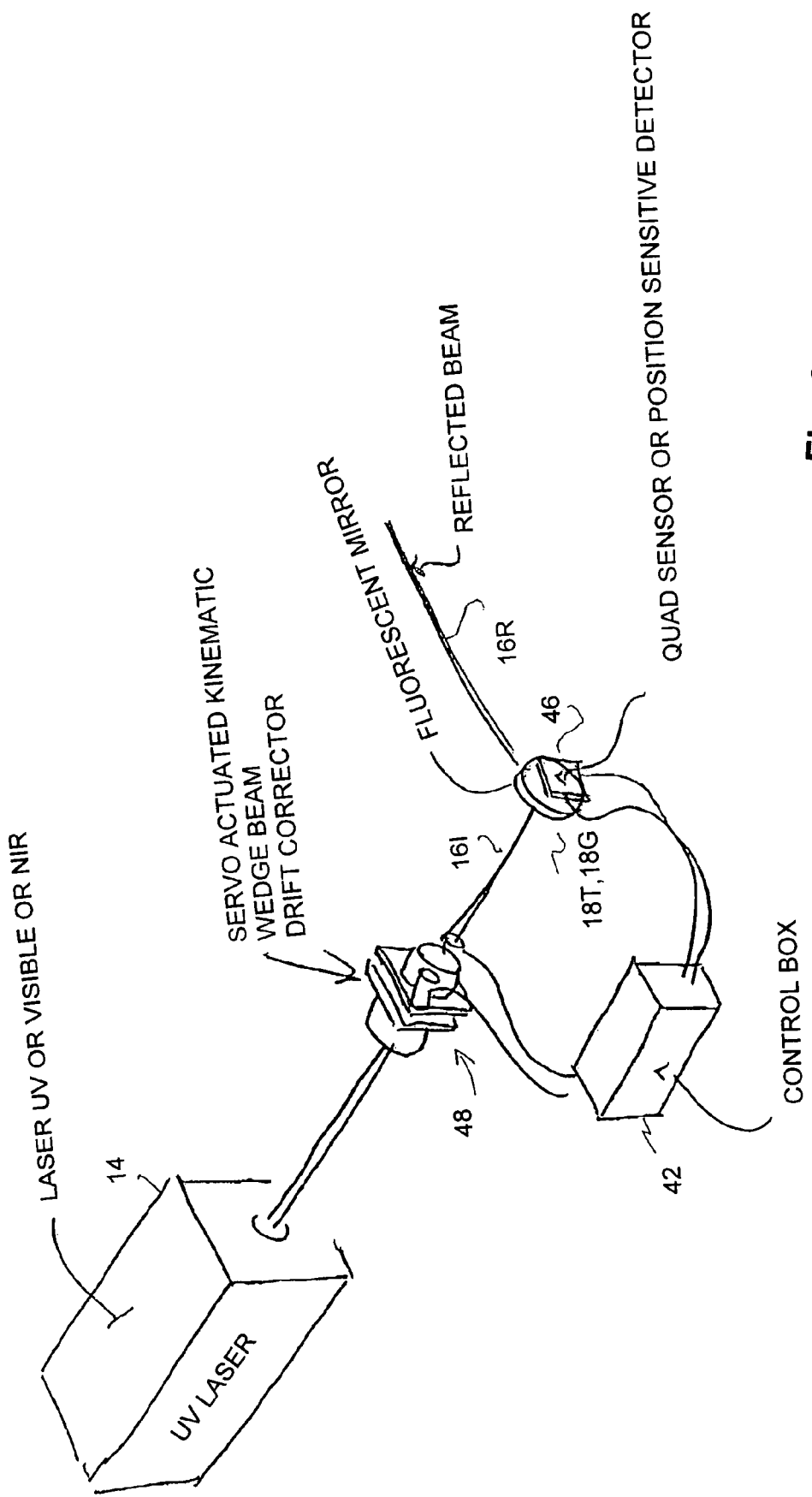
FIG. 6 is a diagram of one stage of a laser beam system alignment system.

Referring lastly to FIG. 6, therein is shown an exemplary system or portion of a system incorporating the above described invention for guiding a laser beam along a desired path or to a desired target. As illustrated, the system or illustrated portion thereof includes a Laser 14 for generating a Laser Beam 16 that is incident on, for example, a Turning Mirror 18T and that is reflected as a Reflected Beam 16R directed along the desired path or to a desired target. As indicated, the Turning Mirror 18T is provided with a Position Sensor 46 that generates beam position outputs to a Computer 42, or other implementation of a beam path correction control box, that in turn generates control signal outputs to a Kinematic Wedge Beam Drift Corrector (Wedge Beam Corrector) 48. As illustrated, the Wedge Beam Corrector 48 is interposed in the path of Incident Beam 16I, that is, in the path of the beam before the mirror, to adjust the point of incidence of the beam on the Turning Mirror 18T and to thereby adjust the alignment of the beam. As will be understood by those of ordinary skill in the relevant arts, a Wedge Beam Drift Corrector 48 is essentially a rotatable prism having a wedge shaped profile wherein the angle and direction of the "wedge" is variable with rotation of the prism, so that the direction and angle through which an input beam is redirected is selectable by rotation of the prism. Wedge Beam Corrector 48 thereby redirects the incoming beam in the direction and angle determined by the control signals to obtain the desired point of incidence of the Incident Beam 16I on the Turning Mirror 18T or Galvanometer Mirror 18G.

D. Methods and Apparatus for Measuring Displacement and Flatness by use of a Laser with Diffractive Optic Beam Shaping and a Multiple Point Sensor Array Using Back Reflection Having considered methods and apparatus for aligning a laser beam and for determining the alignment of a laser beam, the following will now described the method and apparatus of the present invention for determining an aspect of a surface, such as a tilt of the surface, a curvature of the surface, a warping of the surface, a distortion of the surface, or a distance of the surface from a known point.

In summary, and as will be described further in the following, a laser measurement system of the present invention includes a laser generating a laser beam having, for example, an elliptical energy profile, and a beam shape corrector for reshaping the laser beam into a corrected shaped laser beam having a corrected energy profile, such as a Gaussian or Flat Top profile, suitable for subsequent shaping into a measurement laser beam. The beam shape correcting element is followed by measurement shaping element that reshapes the corrected shaped laser beam into a measurement shaped laser beam having an measurement energy profile shaped to be effected by the at least one aspect of the surface, such as a ring shaped beam having a known working distance. The measurement shaped laser beam is then directed onto the surface, typically through an opening in a sensor array, and, after impinging on the surface, is reflected from the surface and back to the sensor array, the reflected beam having been effected, or modified, by the aspect of interest of the surface. Various portions of the reflected laser beam are then measured by the sensors of the sensor array, with the measurements representing or indicating the aspect of interest of the surface.

Therefore considering various exemplary implementations of the invention, FIGS. 7 and 8A-8D, illustrate a laser measurement system 50 of the present invention having a laser 52L generating a laser beam 52 that first passes through a Gaussian shape corrector 54 that reshapes the output laser beam 52 into a Gaussian distribution laser beam 52G, that is, a laser beam having Gaussian energy profile. The laser beam 52G is then passed through a ring diffuser 56 comprised, for example, of a diffractive optical element, that reshapes laser beam 52G into a shaped beam 52S having a generally ring shaped energy profile as illustrated, for example, in any of FIG. 10A, 10B, 10C or 10D. As will become apparent from the following discussions, the specific shape selected for shaped beam 52S will depend upon the particular aspect of the measurement or measurements to be made of a surface 58, such as flatness, tilt, distortion and so on.

Shaped beam 52S is transmitted through an opening 70O in a sensor array 70A and onto surface 72 and, upon impinging on surface 72, is reflected back to sensors 70S of sensor array 70A as reflected beam 52R. As illustrated in FIGS. 7 and 8A, 8B and 8C, the position, dimensions and shape of reflected beam 52R will be altered from the position, dimensions and shape of shaped beam 52S by a number of factors related to surface 72, including the distance of surface 72 from sensor array 70A, any tilt of surface 72 from a position normal to the axis of shaped beam 52S and any curvature or other warping or distortion of surface 72 relative to a flat plane that is normal to the axis of shaped beam 52S.

A sensor array 70A will typically be comprised of a plurality of sensors 70S wherein the pattern of sensors 70s and the shape of shaped beam 52S and thus of reflected beam 52R will be dependent upon the aspect of interest of surface 72.

Exemplary embodiments of a sensor array 70A and possible profiles of shaped beams 52S are respectively illustrated in FIGS. 9A-9C and 11 and in FIGS. 10A-10D, wherein it may be seen that a shaped beam 52S profile and a corresponding sensor array 70A configuration may be selected to best measure any desired aspect of the characteristics of a surface 72.

Figure 12:
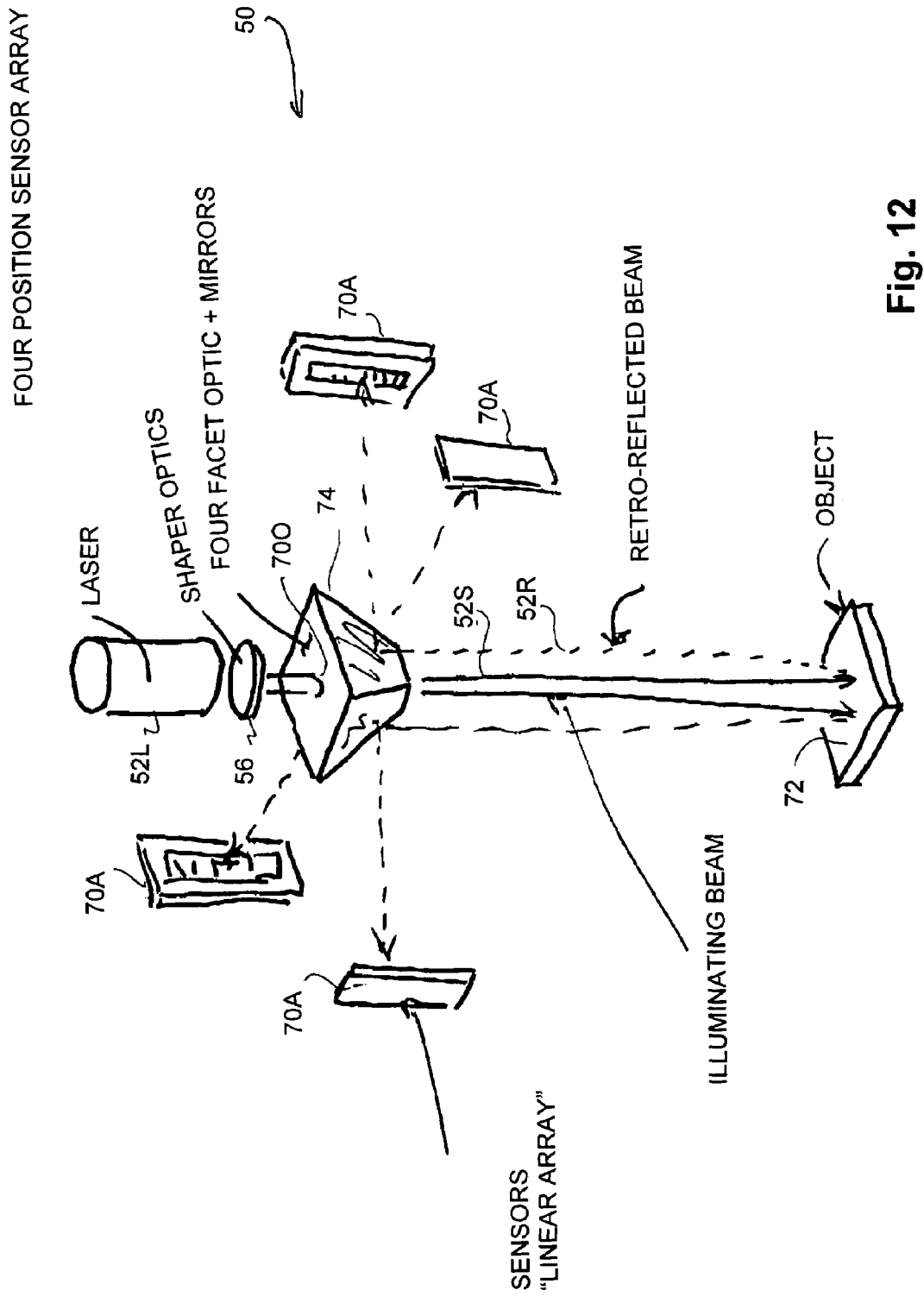
FIGS. 12 and 13 are diagrammatic representations of alternate embodiments of a laser surface measurement system.

As illustrated in FIG. 12, a system 8 may be constructed to employ multiple sensors arrays 70S to measure different aspects of a surface 72 by interposing multi-way splitter optics 74 in the return path of reflected beam 52R to direct reflected beam 52R to a plurality of sensor arrays 70S, each being selected as optimized for a different aspect of the surface 72. Splitter optics 74 may be comprised, for example, of a faceted prism or prisms and mirrors, as will be well understood by those of ordinary skill in the arts.

Figure 13:
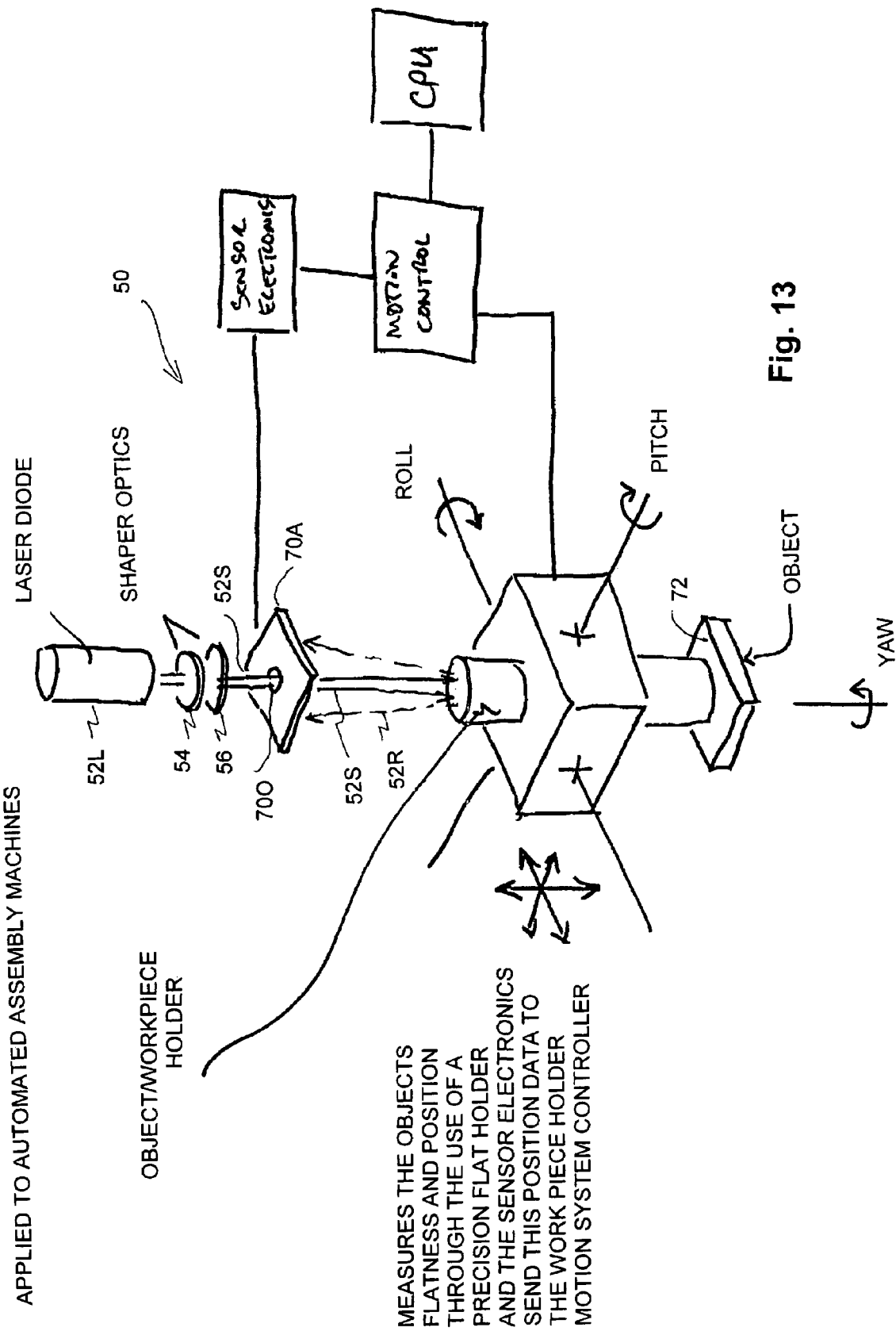

In another embodiment of the present invention, as illustrated in FIG. 13, an object bearing the surface 72 and, if necessary, additional guiding optics, may be mounted on, for example, three axes rotational controllers to selectively control the angle of surface 72 relative to the axis of shaped beam 52S, and thereby the shape and path of reflected beam 52R. This implementation may be employed, for example, to adjustably position the surface 72 with respect to the axis of shaped beam 52S for later operations with, for example, a laser machining beam, or to measure different aspects of surface 72.

Figure 7:
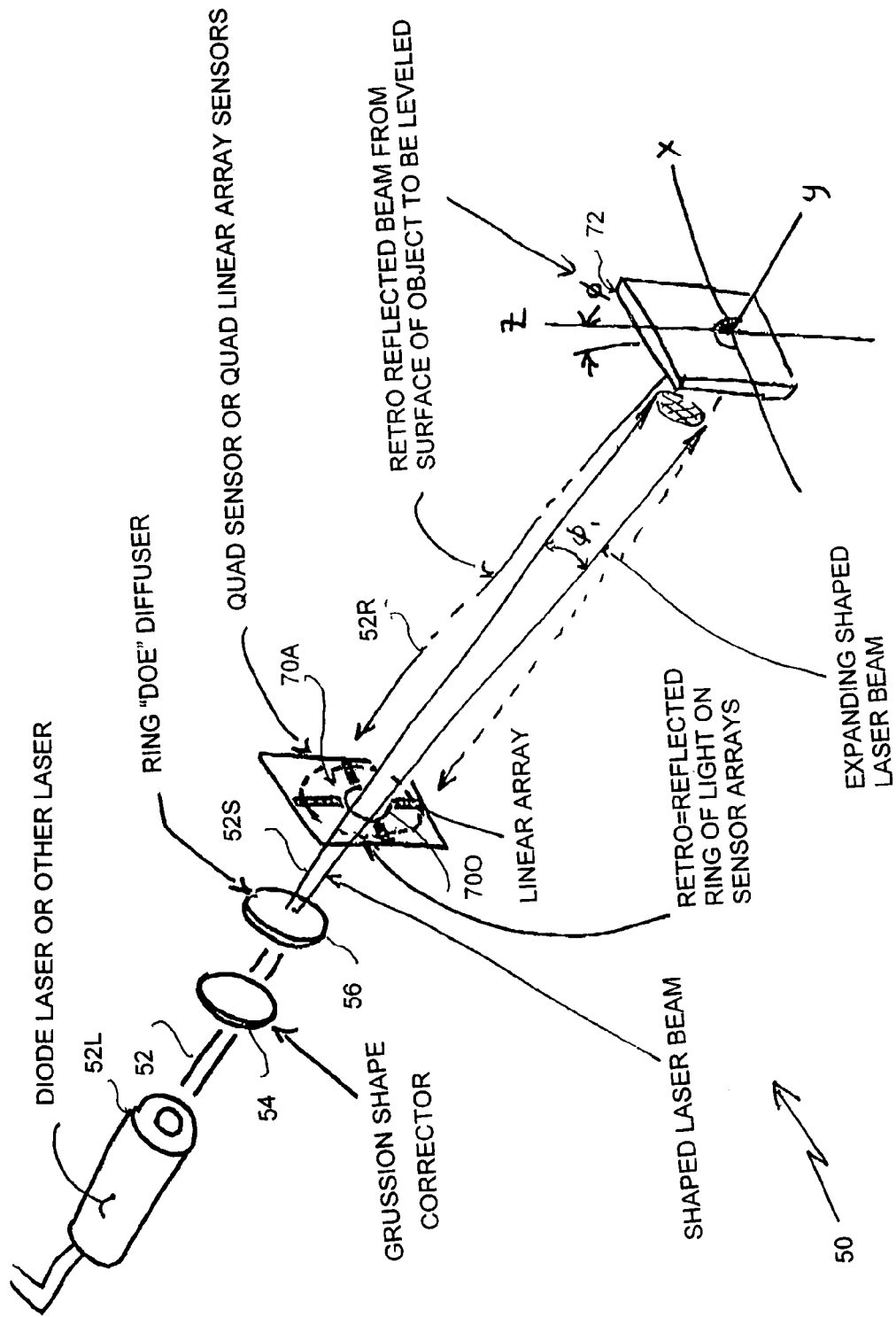
FIG. 7 is a diagrammatic representation of a laser surface measurement system.

Considering certain aspect of the present invention in further detail, FIG. 7 shows the system 8 as constructed along a straight line beam path. The Diode laser 52L produces the laser beam 52, if the laser beam produces an elliptical beam output, the first beam shaping optic 54 (diffractive or refractive in design) transforms the beam 52 into a suitable Gaussian or Flat top profile 52G which is subsequently transformed into a circular ring of laser light 52S with a specific working distance. This ring of laser light travels through an aperture 70A on a printed circuit board with drive electronics which holds the four linear array sensors 70A, 70S. The laser beam 52S travels to its intended target 72 which is defined as the object to be measured. As the laser beam 52S travels to the object 72 it expands at a designed rate to form the ring of light on the surface of the object 72. Once the laser beam 52S ring hits the surface 72 of the object the laser 52R is retro-reflected backwards and begins to travel to the linear sensor array 70A. As the retro-reflected beam 52R travels backwards towards the linear sensor array 70A it continues to expand in size. Once the expanded ring of light hit's the sensor array 70A, the sensors 70S detect its position upon the four linear arrays 70A, 70S. By determining the position of the portions of beam 52R that illuminate the four linear sensor arrays 52S the printed circuit board electronic can determine the distance of the object as well as the flatness of the object.

A basic description of how the sensor detects the distance and flatness is outlined on FIGS. 8A-8C. FIG. 12 shows a close up of a schematic of the linear sensor array configuration and how the beam lands on the sensors. FIGS. 8A-8C describe the distance and flatness calculation method. FIGS. 3 shows different sensor configurations including quad sensors where the intensity of the beam is analyzed for just measuring flatness. FIG. 9, also shows the use of CCD type 2D arrays arranged in a cross or square pattern to offer other options of sensing. FIGS. 10A-10D show a variety of beam shapes that can be utilized to provide different degrees of precision for the sensor measurements.

FIG. 11 shows an alternate sensor configuration which allows this type of sensor to be integrated into an automation type environment. The FIG. 5 configuration also provides for further precision by lengthening the path length of the retro-reflected beams which translates into higher resolution or displacement for small flatness measurements.

FIGS. 12 and 13 show how this type of sensor could be integrated into precision pick and place mechanisms to allow precision adjustment of a parts flatness and position in multiple axes of positions prior to placement of the object being handled or assembled. This configuration shows how the system can be easily made into a closed loop sensor system for rapid correction of the objects flatness and position without the need for sampling of many points and re-sampling after the adjustment is made. This shows the sensor as a real time sensing system.

The above mentioned sensor can also utilize position sensitive detectors which track the beam centroid and allow extremely high resolution to be achieved. The four linear arrays can be either two dimensional (2D detectors) detectors or single axis (1D detectors) and could provide up to 6 axes of measurement and complex vectors can be calculated.

Since certain changes may be made in the above described invention without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A laser measurement system for determining at least one aspect of a surface, comprising:
   a laser generating a laser beam,
   a beam shape corrector for reshaping the laser beam into a corrected shaped laser beam having a corrected energy profile,
   a measurement shaping element for reshaping the corrected shaped laser beam into a measurement shaped laser beam having an measurement energy profile shaped to be effected by the at least one aspect of the surface,
   a sensor array for receiving the measurement shaped laser beam after the measurement shaped laser beam has been reflected from the surface and modified by the at least one aspect of the surface, wherein the sensor array includes a plurality of sensors for receiving and measuring corresponding portions a reflected laser beam from the surface,
   the measured corresponding portions of the reflected laser beam indicate the aspect of the surface,
   a plurality of sensor arrays for determining a corresponding plurality of the at least one aspect of the surface,
   a multi-way splitter in the path of the reflected laser beam for directing a corresponding part of the reflected laser beam to a correspond one of the plurality of sensor arrays,
   the at least one aspect of the surface includes at least one of a tilt of the surface, a curvature of the surface, a warning of the surface, a distortion of the surface and a distance of the surface from the sensor array, and the measurement enemy profile and the plurality of sensors of the sensor array are selected according to the at least one aspect of the surface to the determined.

2. A laser measurement system for determining at least one aspect of a surface, comprising:

a laser generating a laser beam, a beam shape corrector for reshaping the laser beam into a corrected shaped laser beam having a corrected energy profile, a measurement shaping element for reshaping the corrected shaped laser beam into a measurement shaped laser beam having an measurement energy profile shaped to be effected by the at least one aspect of the surface, a sensor array for receiving the measurement shaped laser beam after the measurement shaped laser beam has been reflected from the surface and modified by the at least one aspect of the surface, wherein the sensor array includes a plurality of sensors for receiving and measuring corresponding portions of reflected laser beam from the surface, and wherein the measured corresponding portions of the reflected laser beam indicate the aspect of the surface, the laser generates an elliptical laser beam, the beam shape corrector reshapes the laser beam into a corrected shaped laser beam having a corrected enemy profile wherein the corrected energy profile is one of a Gaussian energy profile and a Flat Top energy profile, and the measurement shaping element for reshaping the corrected shaped laser beam into the measurement shaped laser beam having an measurement energy profile shaped to be effected by the at least one aspect of the surface reshapes the corrected shaped laser beam into a circular ring of laser light having a specific working distance.

* * * * *